(No Model.) 5 Sheets—Sheet 1.
J. R. WILLIAMS.
CIGAR BUNCHING MACHINE.
No. 442,278. Patented Dec. 9, 1890.
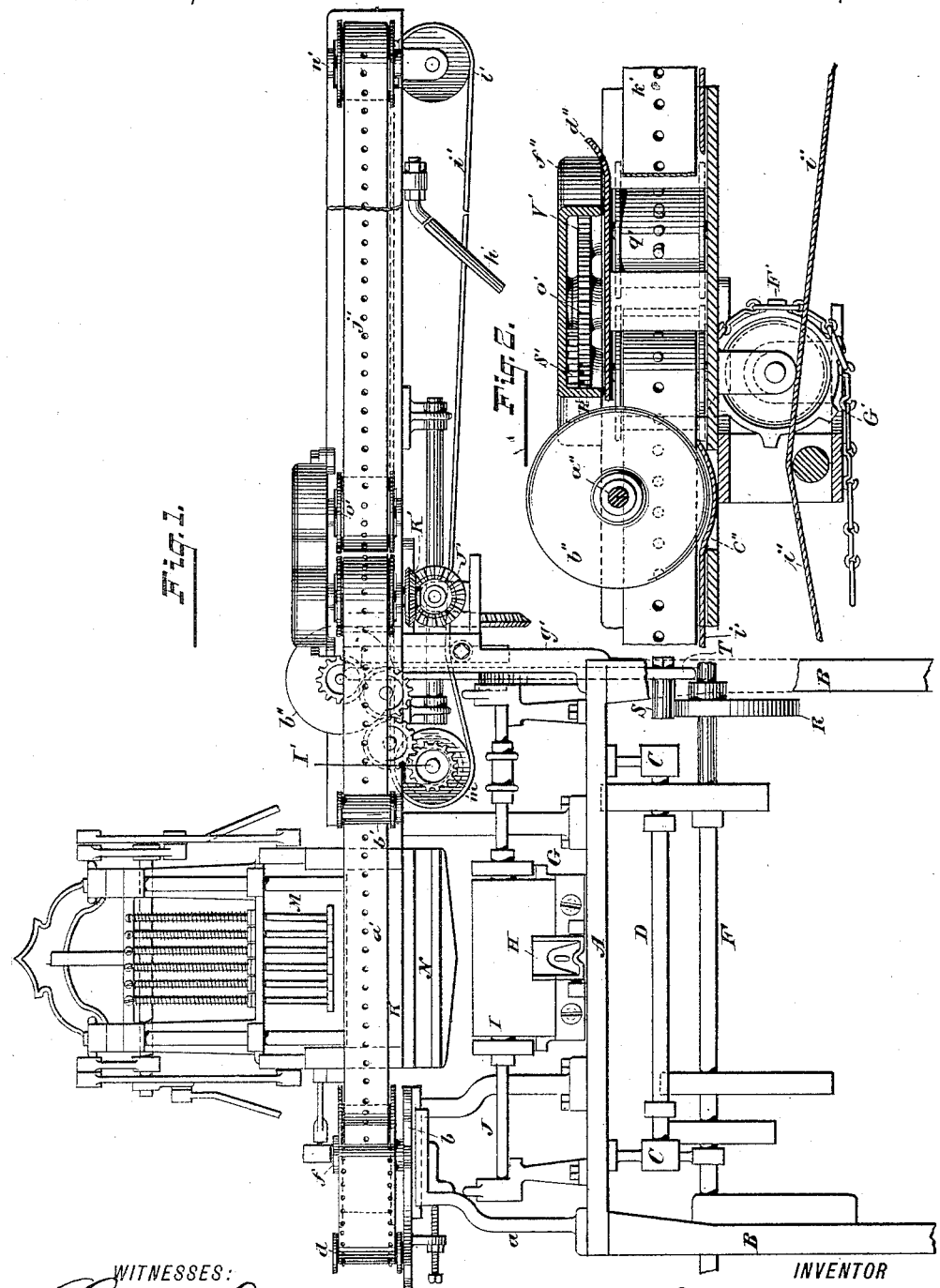
WITNESSES:
Gustave Dieterich.
William Goebel.
INVENTOR
John R. Williams,
BY
Chas. O. Gill
ATTORNEY.

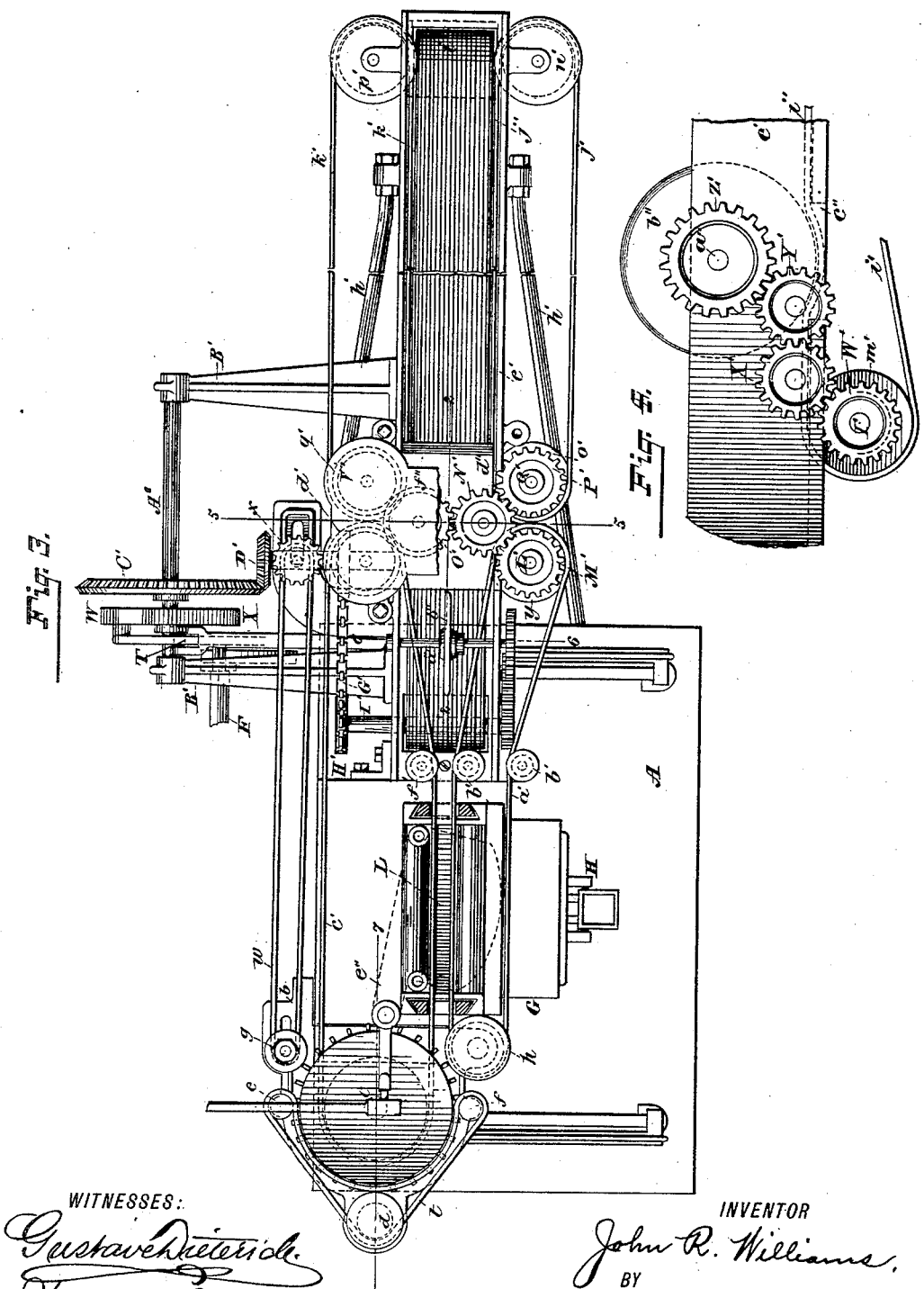

(No Model.) 5 Sheets—Sheet 3.
J. R. WILLIAMS.
CIGAR BUNCHING MACHINE.
No. 442,278. Patented Dec. 9, 1890.
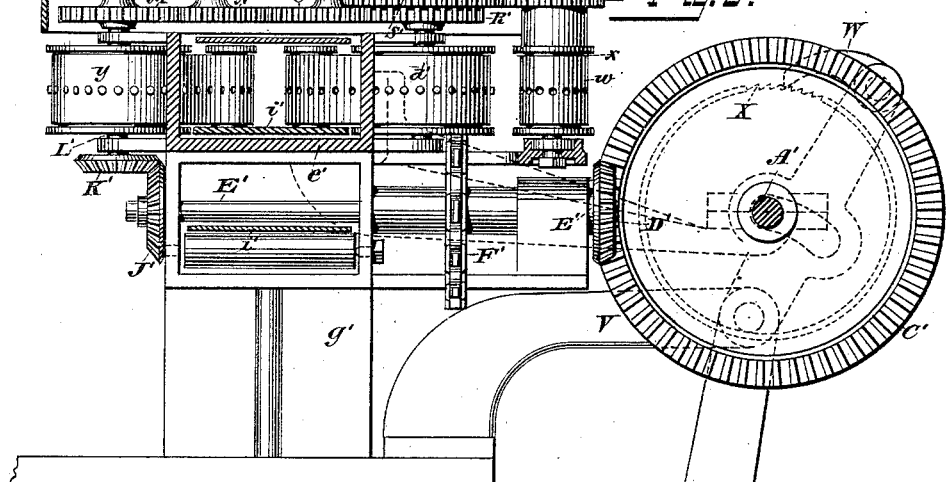
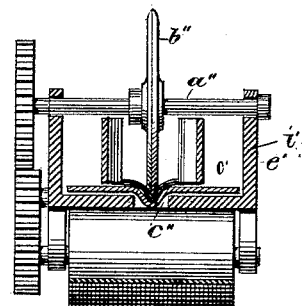
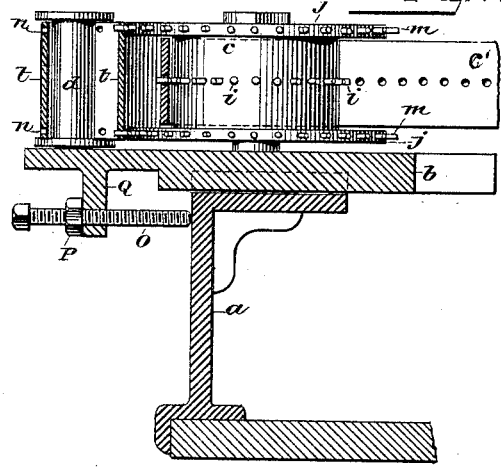
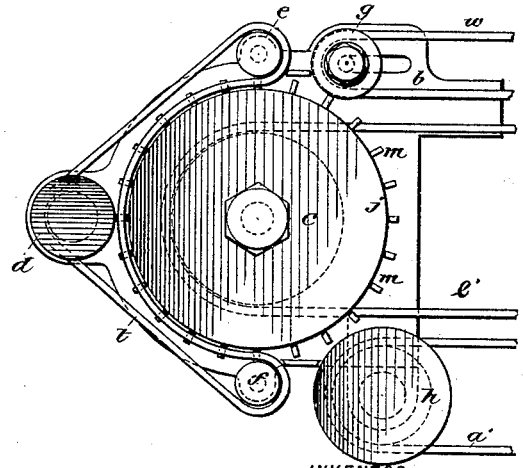
WITNESSES:
Gustave Dieterich
William Goebel
INVENTOR
John R. Williams,
BY
Chas. B. Gill
ATTORNEY.
THE NORRIS PETERS CO., PHOTO-LITHO., WASHINGTON, D. C.

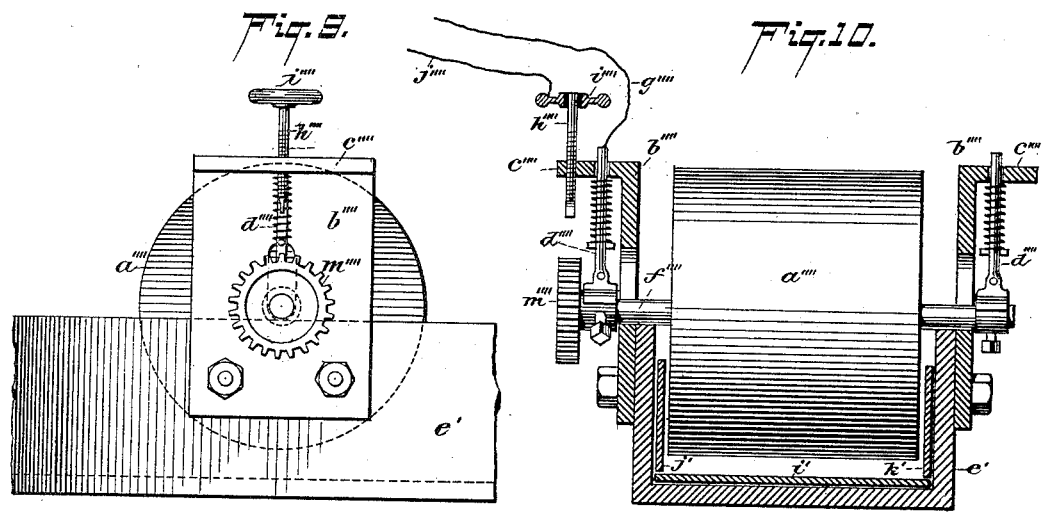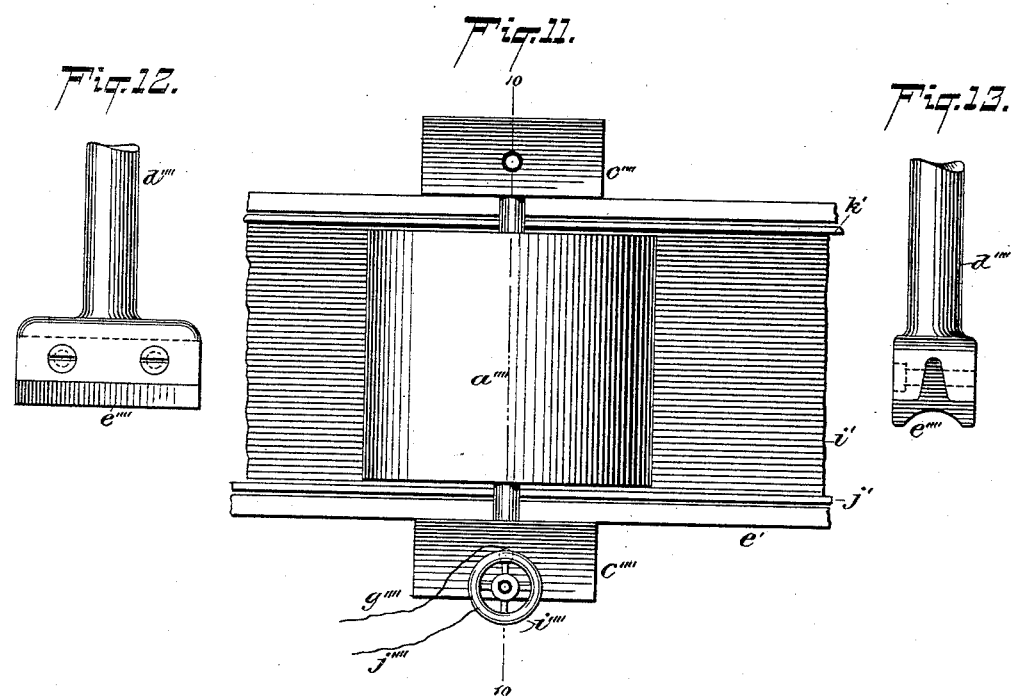

(No Model.) 5 Sheets—Sheet 5.

J. R. WILLIAMS.
CIGAR BUNCHING MACHINE.

No. 442,278. Patented Dec. 9, 1890.

WITNESSES:
Gustave Dieterich
William Goebel

INVENTOR
John R. Williams,
BY Chas. C. Gill
ATTORNEY

United States Patent Office.

JOHN R. WILLIAMS, OF NEWARK, NEW JERSEY.

CIGAR-BUNCHING MACHINE.

SPECIFICATION forming part of Letters Patent No. 442,278, dated December 9, 1890.

Application filed April 3, 1890. Serial No. 346,501. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The invention relates to improvements in cigar-bunching machines, and particularly to machines for the manufacture of cigar bunches from "long-filler" tobacco.

The invention pertains particularly to mechanism for automatically feeding the tobacco to the devices by which the separate charges thereof for the bunches are compressed and conveyed to the rolling mechanism whereby the bunch is formed.

The invention will be fully understood from the detailed description hereinafter presented, reference being had to the accompanying drawings, in which—

Figure 14:
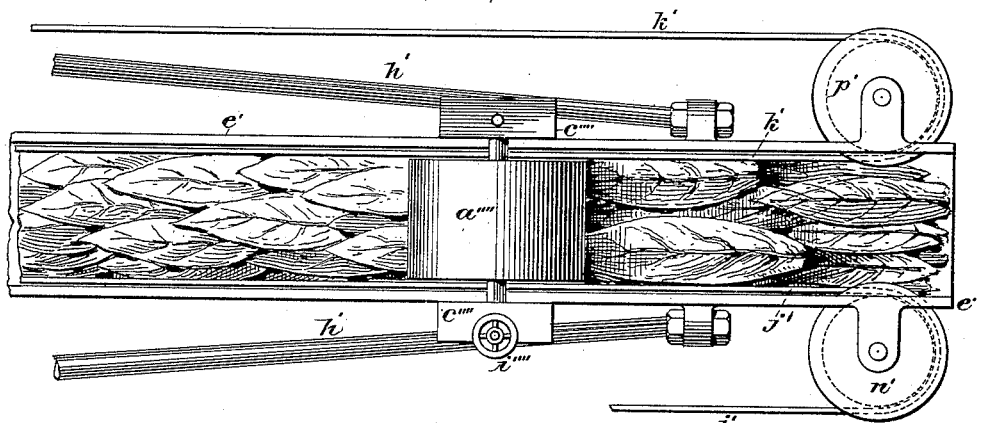
Figure 15:
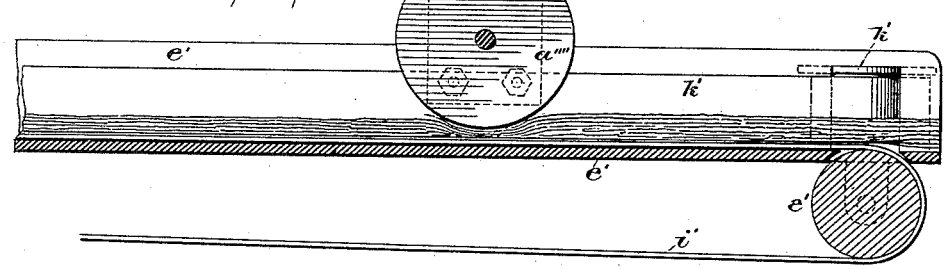
Figure 16:
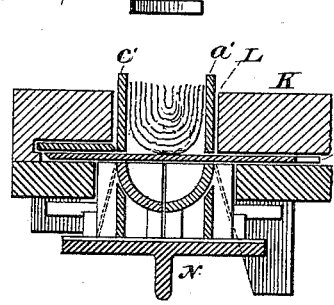
Figure 17:
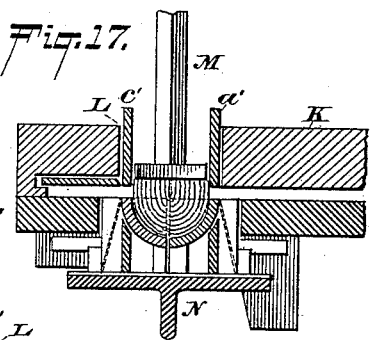
Figure 18:
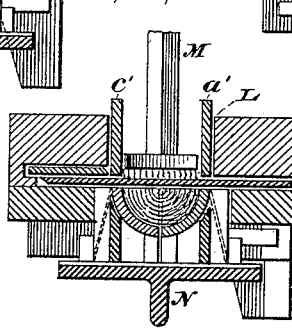

Figure 1 is a front elevation of a cigar-bunching machine having the invention applied thereto. Fig. 2 is a detached vertical section on the dotted line 2 2 of Fig. 3. Fig. 3 is a top plan view of the feeding mechanism constituting the invention, the upper portion of the cigar-bunching machine proper not being presented. Fig. 4 is a detached side elevation, on an enlarged scale, of certain gearing for transmitting motion hereinafter particularly referred to; Fig. 5, an enlarged vertical section on the dotted line 5 5 of Fig. 3, looking toward the bunching-machine proper; Fig. 6, a vertical section on the dotted line 6 6 of Fig. 3; Fig. 7, a vertical transverse section on the dotted line 7 7 of Fig. 3. Fig. 8 is a top plan view of the device illustrated in Fig. 7. Figs. 9 to 13, inclusive, illustrate, on an enlarged scale, means for controlling the supply of tobacco to the feed-trough, Fig. 9 being a side elevation of a part of said trough with the regulating devices applied thereto; Fig. 10, a vertical section of the same on the dotted line 10 10 of Fig. 11, which is a top view of same. Figs. 12 and 13 are detached views of the face and edge, respectively, of a detached portion of the mechanism hereinafter specifically referred to. Fig. 14 is a detached top view of the outer end of the feed-trough, illustrating the position of the leaves as they are fed to the devices by which the separate charges are formed; Fig. 15, a central vertical longitudinal section of same; Fig. 16, a vertical transverse section through the machine at the point where the charges of tobacco are formed and pressed into the charge-receptacle, by which they are carried to the rolling mechanism, said view illustrating the position of the tobacco prior to the depression of the pressers, by which it is forced into the charge-receptacle; Fig. 17, a like view of same, illustrating the position of the tobacco after the pressers have been lowered and the charge forced into the charge-receptacle; and Fig. 18 is a like view of same, illustrating the position of the tobacco after the knife has severed that portion thereof within the receptacle from the surplus portion above said receptacle and beneath said pressers.

In the drawings forming a part of this application I have illustrated a cigar-bunching machine which, without the feeding mechanism which constitutes the present invention, is illustrated and claimed in Letters Patent of the United States No. 422,000, granted to me February 25, 1890. The mechanism of said cigar-bunching machine shown in said Patent No. 422,000 is not claimed herein, but is illustrated with a view of explaining the construction and operation of the feeding mechanism sought to be protected hereby. It will therefore be unnecessary to specifically describe said cigar bunching-machine proper, except in such respects as it may be necessary so to do in order to render the description of the feeding mechanism definite and certain.

Referring to the bunching-machine apart from the feeding apparatus, A designates the bed-plate or table of the machine, mounted on legs B, of suitable form and construction. Below the bed-plate is suspended in hangers C C the fulcrum-shaft D, and at the rear of the machine is journaled in suitable bearings the driving-shaft F, to which power may be applied by the usual band-wheel, and which will be regulated in its motion so as to stop and start as required by the customary clutch-box. (Not shown.)

The band-wheel and clutch-box mechanism for applying power to and regulating the stopping and starting of the driving-shaft F is well known in this class of machines and is in common use. An illustration of the mechanism for applying power to and regulating the motion of the driving-shaft F may be found in my aforesaid patent, No. 422,000.

Upon the bed-plate A is the rolling-table G, which will be provided with the usual apron, held at each end, the bunch-receiver H, and a reciprocating roller I, mounted on the shaft J for rolling the bunch. Above the bunch-rolling mechanism is located an auxiliary table K, having an elongated opening L through it, as shown in Fig. 3, while above this opening L is arranged the series of reciprocating and independently-yielding pressers M for pressing the charge of tobacco through said opening L into the charge-receptacle N, by which it is conveyed to the rolling mechanism, all as described in said Patent No. 422,000. As also fully pointed out in said Patent No. 422,000, there is a knife $e''$ below the auxiliary table K, which knife (shown by dotted lines in Fig. 3) serves, when the pressers M are depressed, to sever that portion of the tobacco within the receptacle N from the portion thereof above said receptacle, as shown in Fig. 18, thus detaching or separating a charge of tobacco for a bunch from the main body of tobacco and leaving said charge within said receptacle N in position to be thereafter conveyed to the bunch-rolling mechanism.

Upon the left-hand end of the table A is secured the standard $a$, which supports the plate $b$, the latter having a rib on its under side to enter a groove on the upper end of the standard, as shown by dotted lines in Figs. 1 and 7, whereby said plate $b$ may receive an adjustment, as hereinafter described, in a longitudinal direction toward or from the center of the machine.

Upon the plate $b$ are mounted on vertical axes the belt-wheels $c\ d\ e\ f$, (see Figs. 3 and 8,) the wheel $c$ being provided at its annular center with the series of pins $i$ and along the periphery of its upper and lower flanges $j$ with the series of pins $m$, the latter to engage the apertures $n$ in the upper and lower edges of the endless belt $t$, as shown in Figs. 7 and 8, which belt, as shown particularly in Fig. 8, travels on the wheels $d$, $e$, $f$, and $c$, and receives its movement from the wheel $c$. Upon the wheel $c$ being rotated the pins $m$ thereon engage the apertures $n$ in the belt $t$ and cause the latter to travel on its wheels. It should be noted that the belt $t$ comes into contact with the belt-wheel $c$ only at the edges of the upper and lower flanges $j$, and hence that a definite space is left between the main body of said wheel $c$ and the moving belt $t$, as shown in Figs. 7 and 8, through which space the surplus tobacco is carried, as hereinafter described. The plate $b$ extends inward to a point close against the vertical side of the upper portion of the bunching-machine proper and supports at opposite sides of the belt-wheel $c$ the belt-wheels lettered $g\ h$, respectively, the former of which, as illustrated in Figs. 3 and 8, is mounted on a spindle which passes through a slot in the said plate $b$, and is provided with a nut at its upper end, by which the spindle may be tightened at any desired point in the said slot, the purpose of said slot and nut being to regulate the adjustment of the wheel $g$, and thereby tighten or slacken the belt $w$, which travels thereon. The belt $w$ travels over the wheel $g$ at the left-hand end of the machine and over the belt-wheel $x$, located at the right-hand end of the machine, as illustrated more clearly in Fig. 3, said wheels $g\ x$ and belt $w$ being at the rear side of the machine. The spindle of the wheel $x$ is also, like the wheel $g$, rendered adjustable by passing through an elongated slot, as shown in Fig. 3, in the customary manner known to mechanics.

The belt-wheel $h$ is connected with the belt-wheel $y$ by means of the endless belt $a'$, which has a traveling movement over said pulleys $h\ y$ and against the small wheels $b'$, as shown in Fig. 3, the purpose of which small wheels $b'$ is to keep that portion of the said belt $a'$ at the left thereof in parallel lines with the belt $c'$, which moves upon the wheel $c$ and wheel $d'$. The right-hand portion of the belts $c'$ and $a'$ are deflected outward in opposite directions from the longitudinal center of the feed-trough $e'$, as shown in Fig. 3, in order that the tobacco as it is carried along said trough $e'$, as hereinafter described, may be moved together at opposite sides by the converging walls of the facing sides of the belt $a'\ c'$ and then carried between that portion of the said belts at the left of the pulleys $b'$ and $f'$, the facing sides of which portion of the belts are parallel with each other, as illustrated in the drawings. The left-hand portion of the belts $a'\ c'$ at their facing sides travel one on each side of the opening L, formed in the auxiliary table K, and said facing sides of said belts form an upward extension of the walls of said opening to receive the body of tobacco and permit its compression through said opening L by the series of yielding pressers M, the surplus tobacco being carried along by the belts. The belt $c'$ may be tightened, so as to remain taut on the wheels, by means of the adjusting-screw O and locking-nut P. The screw O extends through an internally-threaded aperture in the lug Q, extending downward from the plate $b$, as shown in Fig. 7, and the point of said screw has a bearing against the standard $a$. By adjusting the screw O it is obvious that the plate $b$ may be moved longitudinally on the standard $a$ and be made thereby to cause the wheel $c$ to draw the belt $c'$ taut.

The feed-trough $e'$ consists of a metallic elongated box supported upon the upper end of the vertical bracket $g'$ and sustained by the brace-rods $h'$, the said box having its bottom covered by the endless traveling belt $i'$ and its sides for nearly its entire length covered by the endless traveling belts $j'\ k'$, the purpose of the belts $i'\ j'\ k'$ being to impart to the trough $e'$ moving surfaces, which during the operation of the machine will carry the tobacco to its point of compression between the facing sides of the belts $a'$ $c'$ above the elongated opening L. The belt $i'$ moves upon the wheels $l'$ and $m'$, (shown more clearly in Fig. 1,) the belt $j'$ moves upon the wheels $n'$ and $o'$, and the belt $k'$ moves upon the wheels $p'$ and $q'$, the walls of the trough $e'$ being cut away sufficiently to permit the edges of the wheels supporting said belts to project inward sufficiently to allow the facing sides of the belts $j'$ $k'$ to be within the said trough $e'$.

The wheels $n'$, $p'$, $o'$, $q'$, $d'$, and $y$ are provided with the series of pins $r'$, similar to the pins $i$, (shown enlarged in Fig. 7,) to engage the series of apertures in the belts $c'$, $a'$, $k'$, and $j'$, (shown in Fig. 1,) arranged along the longitudinal center of said belts.

I will now describe the mechanism by which motion is imparted to the wheels $d'$, $q'$, $o'$, and $y$ and moving belts by which the tobacco is fed to the point of its compression below the series of pressers M.

Upon the driving-shaft F is secured the cam R, which during its revolution is caused to come into contact with the roller S, secured to the lower end of the rocking lever T, pivotally secured to the outer end of the bracket V, (see Figs. 3 and 5,) the upper end of said lever T carrying the pawl W in position to engage the teeth of the ratchet-wheel X, as shown by dotted lines in Fig. 5. The roller S is secured upon the pin Y, which is adjustable in the elongated slot Z, for the purpose of regulating the stroke of the lever T. The ratchet-wheel X is mounted upon the auxiliary driving-shaft A', which is supported in journals at the outer end of the bracket-arms B' B', as shown in Fig. 3, and the upper portion of the rocking lever T has an elongated slot (shown by dotted lines in Fig. 5) which incloses said shaft A' and limits the movement of the said lever in a well-known manner. The purpose of the cam R, rocking lever T, pawl W, and ratchet-wheel X is to effect the rotation of the shaft A' from the driving-shaft F and through said shaft A' and its connected gearing to impart from the driving-shaft F the proper movements to the belts and other operative elements, as hereinafter pointed out.

Upon the shaft A' is secured the beveled gear-wheel C', (see Figs. 3 and 5,) which meshes with the beveled pinion-wheel D', mounted upon the outer end of the transverse shaft E'. The shaft E' extends transversely beneath the feed-trough $e'$, as shown more clearly in Fig. 5, and is supported in extensions from the vertical bracket $g'$.

Upon the shaft E' is secured the sprocket-wheel F', which is connected by a chain G', as shown in Figs. 2 and 3, with the sprocket-wheel H', secured upon the outer end of the shaft I', carrying the wheel $m'$, which supports the inner end of the belt $i'$, constituting the lower surface of the trough $e'$. Upon the front end of the transverse shaft E' is secured the beveled pinion-wheel J', which meshes with the similar pinion-wheel K', mounted upon the lower end of the vertical shaft L', which carries the belt-wheel $y$, located at the right-hand end of the traveling belt $a'$.

Upon the upper end of the vertical shaft L' is secured the gear-wheel M', which meshes with the intermediate pinion N', the latter engaging the pinion O' and also the gear-wheel P', which is secured on the upper end of the shaft Q', carrying the belt-wheel $o'$, located at the left-hand end of the traveling belt $j'$. The gear-wheel O' engages the gear-wheel R', secured upon the upper end of the vertical shaft carrying the belt-wheel $d'$, and the gear-wheel S' upon the upper end of said shaft of said wheel $d'$ engages the pinion T', which is on the upper end of the belt-wheel $x$, carrying the belt $w$. The gear-wheel O' also engages the gear-wheel V', secured upon the upper end of the shaft carrying the belt-wheel $q$, as shown by full lines in Fig. 2 and by dotted lines in Fig. 3. It will be seen that the motion communicated to the shaft E' from the auxiliary driving-shaft A' and beveled gear-wheels C' D' is imparted through the beveled gear-wheels J' K' to the gear-wheels M', N', O', P', R', S', and T', and is by these gear-wheels communicated to the belt-wheels $y$, $o'$, $d'$, $q'$, and $x'$, which belt-wheels impart their motion to the traveling belts $c'$, $a'$, $w$, $k'$, $j'$, and $i'$, the effect of the movement of the said belts being to convey the tobacco inward along the trough $e'$, as hereinafter described. The movement from the auxiliary shaft A' to the transverse shaft E' has the effect also of rotating the sprocket-wheel F' and, through the chain G', of causing the revolution of the sprocket-wheel H' and shaft I', the end of which shaft is connected through the intermeshing gear-wheels W', $x'$, Y', and Z' with the transverse shaft $a''$, as shown in Fig. 4. The shaft $a''$ extends transversely across the upper portion of the trough $e'$, as shown in Figs. 2 and 3, and carries at about its center the presser-wheel $b''$, which has a revolving movement imparted to it through the said gearing connecting the transverse shaft I' with the transverse shaft $a''$ above described. The bottom of the trough $e'$ is provided with an elongated opening $c''$ (see Figs. 2, 4, and 6) to admit the edge of the wheel $b''$ and the portion of the belt $i'$ pressed therein by the said wheel $b''$, as indicated in the drawings. The elongated opening $c''$ is shown in cross-section in Fig. 6, and its length is illustrated in Figs. 2 and 4. The purpose of the presser-wheel $b''$ will appear hereinafter.

In the operation of the invention, motion being imparted from the driving-shaft F to the auxiliary shaft A' and connecting mechanism, as above described, the leaves of tobacco for the "fillers" are placed lengthwise in the trough $e'$, overlapping each other, as shown in Fig. 14, and carried by the belts $i'$, $j'$, and $k'$ beneath the transverse plate $d''$. Thence said leaves are moved between the converging facing sides of the belts $a'$ and $c'$ to the opening L in the table K, where at regular intervals the tobacco is compressed by the pressers M and forced through the opening L into the charge-receptacle N, that portion of the tobacco within the charge-receptacle N being severed from the portion thereof above said receptacle by the action of the knife $e''$, (shown by dotted lines in Fig. 3,) the surplus tobacco continuing its movement between the facing sides of the belts $a'$ and $c'$ until caught between the belts $c'$ and $t$ after having passed beyond the contact of the belt $a'$. The surplus tobacco after having passed beyond the belt $a'$ is carried around the roller $c$, between the belts $c'$ and $t$, and thence continued in its movement between the belts $c'$ and $w$, which carry said surplus to a convenient point of discharge. The traveling belts have imparted to them an intermittent motion through the medium of the pawl W and ratchet X, and hence the feeding of the tobacco may be regulated with a due regard to the operation of the pressers M.

In feeding the leaves to the trough $e'$ no particular care is necessary, except that it is desirable, in order to obtain the best results, that the leaves be spread out lengthwise in the trough with their edges and ends overlapping each other and with the body of tobacco of about an even thickness or depth. The body of tobacco before reaching the elongated opening L passes beneath the wheel $b''$, which has a narrow edge, and depresses the traveling body of tobacco along its longitudinal center, and thereby effects the turning up of the edges of said body of tobacco, which in that condition is carried onward between the converging facing sides of the belts $a'$ $c'$, and thence to the elongated opening L, as shown as clearly as seems possible by a line-drawing in Fig. 16, which represents in cross-section the relative positions of the tobacco, the knife $e''$, pressers M, and charge-receptacle H. When the knife $e''$ is beneath the opening L, as shown in Fig. 16, the pressers M are in their elevated position; but upon the descent of the pressers the said knife will turn from beneath the said opening L and permit the pressers M to force the tobacco through said opening and into the charge-receptacle H, as shown in Fig. 17, whereupon the knife $e''$ will sever the surplus tobacco, as shown in Fig. 18, and the receptacle H will convey the charge to the bunch-rolling mechanism, while the pressers M again ascend and the traveling body of tobacco moves onward between the belts, bringing a fresh portion of said body over the opening L and carrying away the surplus.

The position of the wheel $b''$ with relation to the elongated opening $c''$ is illustrated in Figs. 2 and 6, in which it will be observed that the edge of the wheel is capable of depressing the belt $i'$ along its longitudinal center as said belt moves beneath it, and hence when the tobacco-leaves are carried along by said belt in a moving body or layer the wheel $b''$ will depress them along the center of said belt $i'$, and thereby effect the turning up of the edges of the body or layer of leaves, as above described.

The feed apparatus constituting the invention may be successfully employed in the manufacture of scrap and short-filler cigars as well as for long-filler cigars, and hence it is to be understood that I do not confine the invention to the feeding of unbroken leaves of tobacco placed lengthwise upon the belt $i'$.

By extending the trough $e'$ a suitable distance to the right of the machine proper, as illustrated in Fig. 1, the attendant is given sufficient time to conveniently keep the trough $e'$ supplied with tobacco and to arrange the leaves therein in convenient condition for the proper formation of the charges for the bunches. The plate $d''$ extends across the upper portion of the trough $e'$ and serves to keep the tobacco down while entering between the converging facing sides of the belts $a'$ $c'$, and said plate $d''$ constitutes also the lower portion of the box inclosing the gear-wheels, by which motion is communicated to the wheels $d'$, $q'$, $y$, and $o'$, the top of the box covering said gearing being formed by the plate $f''$.

By providing the tobacco-carrying belts with the series of holes to engage the pins on the belt-wheels I secure perfect uniformity of movement in said belts, preventing any slipping in the latter or any one or more of them and insuring the regular operation intended.

Referring to Figs. 9 to 13, inclusive, $a''''$ designates a roller mounted in bearings $b''''$, each of which consists of a plate having an elongated slot to receive the end of the shaft of the roller $a''''$, as shown in Fig. 10, said bearings being secured to opposite sides of the feed-trough $e'$ and provided with flanges $c''''$ at their upper ends. The shaft of the roller $a''''$ has a downward tension imparted to it by means of the spring-rods $d''''$, which pass through apertures in the flanges $c''''$ and carry at their lower ends the insulating material $e''''$, as shown enlarged in Figs. 12 and 13, which insulating material bears upon the shaft $f''''$ of the roller $a''''$. One of the spring-rods $d''''$ is connected by a wire $g''''$ with an electric battery and is adjacent to the threaded rod $h''''$, secured in a threaded aperture in the flange $c''''$. The threaded rod $h''''$ has upon its upper end the wheel or head $i''''$, which is connected with the electric battery by means of the conducting-wire $j''''$ and is insulated from the rod $h''''$. The lower end of the rod $h''''$ is pointed, as shown, so as to be capable, when depressed, of entering between the teeth of the gear-wheel $m''''$, secured upon the end of the shaft $f''''$.

In the operation of the devices illustrated in Figs. 9 to 13, inclusive, the elevation of the roller $a''''$ is effected by the tobacco passing along beneath it within the trough $e'$, and the roller $a''''$ performs two functions, one being to preserve the tobacco in compact condition upon the lower belt of the feed-trough $e'$, while the other is to cause an alarm in case too much tobacco is being fed to the said trough. Upon an undue quantity of tobacco being fed to the feed-trough $e'$ the effect will be that the roller $a''''$ will be elevated sufficiently to cause the teeth of the wheel $m''''$ to engage the lower pointed end of the threaded rod $h''''$, under which condition the rotation of the roller $a''''$ would cease and retard the passage of the tobacco along the trough to a definite degree. If, however, the attendant should continue to feed tobacco to the trough, not observing the fact that the roller $a''''$ had ceased to rotate, the further upward passage of the roller $a''''$ would bring the upper end of the spring-rod $d''''$ against the rim of the wheel or head $i''''$ and establish the electric circuit, which would include an alarm, the latter being sounded by the completion of the circuit and notifying the attendant a second time that too much tobacco was being fed to the trough $e'$. The teeth of the wheel $m''''$, lightly engaging the lower pointed end of the rod $h''''$, would cause the roller $a''''$ to cease rotating; but this engagement of the said rod with said wheel would not of itself establish the electric circuit, since at such time the upper end of the spring-rod $d''''$ would be close to but not in actual contact with the wheel or head $i''''$. As soon, however, as the tobacco in the trough should force the roller $a''''$ and gear-wheel $m''''$ upward sufficiently to cause the lower end of the rod $h''''$ to enter entirely between the teeth of the wheel $m''''$ this additional upward movement would bring the upper end of the rod $d''''$ into contact with the wheel or head $i''''$, and thereby make the circuit and sound the alarm. It will be observed that the rod $h''''$ may be adjusted vertically so as not to interfere with the gear-wheel $m''''$ until an undue quantity of tobacco had been fed to the trough $e'$, and hence that the quantity of tobacco for the different sizes of cigars will determine the point at which the said gear-wheel and rod should engage each other. The electric battery and alarm-bell in the circuit with the wires $g''''$ and $j''''$ are not illustrated, since they are of the usual well-known forms in general use and on sale for various purposes. When the roller $a''''$ has been elevated, so that the gear-wheel $m''''$ engages the lower end of the rod $h''''$, said roller has a tendency to sweep the tobacco backward; but of course it will be apparent that if the trough $e'$ is forced with tobacco by the attendant not recognizing the fact that the roller $a''''$ has ceased to rotate the slight further upward movement of the roller $a''''$ which will be permitted by the depth of the teeth of the gear-wheel $m''''$ will cause the alarm to ring continuously until the tobacco has been withdrawn from beneath the roller $a''''$ and the upper end of the spring-rod $d''''$ relieved from contact with the head or wheel $i''''$ upon the upper end of the rod $h''''$.

The devices illustrated in Figs. 9 to 13, inclusive, aid in the formation of bunches of uniform size and density, and also prevent such an undue quantity of tobacco being fed to the machine as might destroy its functions or fracture some of its parts.

What I claim as my invention, and desire to secure by Letters Patent, is—

1. In a cigar-bunching machine, the feed-trough having the belts at its bottom and sides, combined with the belts having converging facing sides for a portion of their length and then parallel facing sides, the table having an opening between said parallel sides, the pressers for action on the tobacco, and a knife for severing the charge, substantially as set forth.

2. In a cigar-bunching machine, the feed-trough, combined with the belts $a'$ $c'$, traveling on edge and carrying the tobacco from said trough, the table having the elongated opening between the facing sides of said belts, and means, substantially as described, for forcing the tobacco through said elongated opening and severing the charge, substantially as set forth.

3. In a cigar-bunching machine, the feed-trough and the belts $a'$ $c'$, traveling on edge and having converging facing sides at their entrance end and then parallel facing sides, the table having an opening between said parallel sides, the pressers for forcing the tobacco through said opening, and the knife for severing the charge, substantially as set forth.

4. In a cigar-bunching machine, the feed-trough and the belts $a'$ $c'$, traveling on edge, with the converging facing sides and then parallel facing sides, and adapted to move the tobacco to the point where the charges are detached, combined with the presser $b''$, which acts on the center of the moving body of tobacco, substantially as set forth.

5. In a cigar-bunching machine, the feed-trough and the belts $a'$ $c'$, traveling on edge and adapted to move the body of tobacco to the point where the charges are detached, combined with the belt $t$, which coacts with the belt $c'$ to carry the tobacco after it has passed from contact with the belt $a'$, and the belt $w$, which coacts with the belt $c'$ to move the tobacco after it has passed beyond the influence of the belt $t$, substantially as set forth.

6. In a cigar-bunching machine, the feed-trough, combined with the belts $a'$ $c'$, traveling on edge and adapted to carry the tobacco from said trough to the point where the charges are detached, and wheels $h$, $y$, $c$, and $d'$, carrying said belts, and the belt $t$, mounted on wheels $d$ $e$ $f$, the belt $c'$ bearing against the body of the wheel $c$, while the belt $t$ has a bearing against its upper and lower flanges, substantially as set forth.

7. In a cigar-bunching machine, the feed-trough $e'$ and the belts $a'$ $c'$, traveling on edge, with converging facing sides and then parallel facing sides and adapted to move the tobacco to the point where the charges are detached, combined with the roller $a''''$, shaft $f''''$, gear-wheel $m''''$ on the end of said shaft, and the adjustable rod $h''''$, located in position to be engaged by said gear-wheel upon the roller $a''''$ being unduly elevated by the supply of tobacco in the said trough, substantially as set forth.

8. In a cigar-bunching machine, the feed-trough $e'$, having a traveling belt at its base, and the belts $a'$ $c'$, traveling on edge and carrying the tobacco from the said trough to the point where the charges are detached, combined with the roller $a''''$, mounted on the vertically-movable shaft $f''''$, the spring-rod $d''''$, connected with one wire from the battery and having an insulated bearing on said shaft, and the adjustable rod $h''''$, having an insulating-head $i''''$, connected with the other wire from the battery and being in position upon the elevation of the roller $a''''$ to come into contact with the said rod $d''''$, substantially as set forth.

Signed at New York, in the county of New York and State of New York, this 1st day of February, A. D. 1890.

JOHN R. WILLIAMS.

Witnesses:
CHAS. C. GILL,
ED. D. MILLER.